3,050,405
FOOD PRESERVING PROCESS
Samuel H. Hopper, Indianapolis, Ind., assignor to Economics Laboratory, Inc., a corporation of Delaware
No Drawing. Filed June 8, 1960, Ser. No. 34,645
8 Claims. (Cl. 99—222)

This invention relates to a new and improved process or method of treating various types of foods among which are dairy products by the use of an additive in the form of a germicidal product such as aqueous solution of beta-propiolactone.

The recent discovery of beta-propiolactone, having the chemical formula

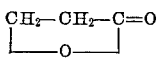

and hereinafter termed BPL (a registered trademark of Celanese Corporation of America) has resulted in its advantageous and extensive use in a wide variety and range of fields from the manufacture of plastics to that of the practice of medicine.

BPL comprises a colorless liquid having the following physical properties:

Boiling point _____ 155 C. (dec.).
Melting point _____ −33.4 C.
Density, 20/4 C _____ 1.1490.
Vapor press. (25 C.) _____ 3.4 mm. Hg.
Water sol. (25 C.) _____ 37% (by volume).

This material may be stored at 4° C. for three years without change; at 54° C. it will polymerize within six to eight weeks. The material reacts readily with numerous organic compounds containing available amino, carboxyl, hydroxyl and sulphydryl groups. The material has a rate of hydrolysis expressed as the half life, which is the time required to reduce a given concentration of BPL by 50% at a given temperature.

Rate of hydrolysis of BPL—

| Temperature: | Half life (minutes) |
|---|---|
| 10 C. or 50 F. | 1080 or 18 hrs. |
| 25 C. or 77 F. | 210 or 3½ hrs. |
| 50 C. or 122 F. | 20. |
| 75 C. or 167 F. | 5. |

The biological properties of the material (BPL) render it capable of effective use as a germicide, bactericide, viricide, sporicide, fungicide and algicide.

The primary object of the present invention is to provide a new and improved treating process for foods, normally subject to spoilage by reason of bacterial growth, by the use of an additive in the form of a germicidal BPL solution to effectively kill the microorganisms and stabilize the products against deterioration caused by the development of harmful bacteria.

Another object resides in the provision of a germicidal additive in the form of an aqueous solution of BPL that results in the control of the microbiological growth of bacteria in the treated food product to insure its longer shelf life.

Another object resides in the provision of a germicidal additive in the form of an aqueous solution of BPL having a range of concentration that is capable of effecting the desired control on growth of microorganism contained in the foods without imparting any detrimental effect on the treated foods.

Another object resides in the provision of an additive for food products that effects bacteriological control in the treated foods without forming toxic residuals.

Another object resides in the provision of an additive for foods that reverts to an isomer of lactic acid.

Other objects and advantages will become apparent from the following description of illustrative embodiments of the invention.

Since dairy products represent one type of food that has heretofore been particularly susceptible to short shelf life and rapid deterioration caused by bacterial growth, the use of the present treating process on this type of food will serve admirably to illustrate the marked advantages of the present invention.

The present invention is based upon my discovery that food products, among which are many dairy products, have been effectively treated to increase their shelf life by the addition of a small amount of BPL, preferably in an aqueous solution.

Since the chemical material BPL, or its equivalent, is well known and its method of production forms no part of the present invention, there will be no further discussion of the material per se.

Preparation of BPL Solution

BPL as purchased contains approximately 37% active ingredients and has a specific gravity of 1.149. To make a 10% solution from the original 37% stock solution, take 2.3 milliliters (hereinafter abbreviated as ml.) of stock solution and add to it 7.7 ml. of water which has been previously cooled to about 4° C. (39.2° F.). Take 1 ml. of the 10% solution of BPL and add to it 49 ml. of sample to be tested. In the resultant 50 ml. of sample and BPL, the final concentration of BPL is 0.2%. Any desired final concentration of BPL can be most conveniently obtained by starting with 10% solution prepared in the above stated manner. For various desired concentrations of the BPL solution, use aliquot portions in desired ratios.

Use of BPL in Milk Inoculated With Staphylococcus aureus

The following is a discussion of an experiment using an aqueous solution of BPL in pasteurized homogenized milk inoculated with 0.5 ml. of a 24 hour culture of Staphylococcus aureus in a nutrient broth. 50 ml. of inoculated pasteurized homogenized milk was plated out, the average inoculum, made from triplicate plates at each dilution was $2.83 \times 10^6$ per ml. or 2,830,000 bacteria per ml. 9 ml. of the inoculated milk was placed in each of four sterile test tubes which were identified as tubes Nos. 1, 2, 3 and control.

Tube #1: Add 1 ml. of 10% stock solution of BPL which gives a final concentration of 1% BPL.

Tube #2: Take 1 ml. of 10% stock solution of BPL and add to it 9 ml. of cold water to make 1% solution of BPL. Take 1 ml. of 1% BPL and add it to tube #2 to make final concentration of 0.1% BPL.

Tube #3: Take 1 ml. of 1% aqueous solution of BPL made for use in tube #2 and add to it 9 ml. of cold water in order to make a solution of 0.1% BPL and add it to tube #3 in order to make a final concentration of 0.01% of BPL in this tube.

Control: Add 1 ml. of sterile water to this tube.

Incubate all tubes at 37° C. and check for sterility.

The results of tests conducted over a period of twenty-seven days (shown in the following table) illustrates clearly the keeping quality of whole milk inoculated with Staphylococcus aureus when treated with an aqueous solution of BPL when the several test tubes were maintained at a 37° C. (98.6° F.) temperature. From the following table, it will be noted that the sample contained in tube #2 which had been treated with 0.1% BPL remained fresh over the entire twenty-seven day period while the contents of tube #1 gelled into a solid mass during the first day and the contents of tube #3 and the control tube had soured within twenty-four hours time and were therefore discarded.

*Keeping Quality of Whole Milk Inoculated With S. aureus and Treated With BPL*

| Time | Percent concentration BPL solution | | | Control | |
|---|---|---|---|---|---|
| | Tube #1, 1% | Tube #2, 0.1% | Tube #3, 0.1% | Inoculated | Not inoculated |
| 1 day | Gelled into solid chunk | Fresh, OK | Very sour, precipitated | Sour and putrid | Precipitated, sour. |
| 2 days | No further change | No change | | | |
| 5 days | ----do---- | ----do---- | ----do---- | These samples discarded because of bacterial growth. | |
| 12 days | ----do---- | ----do---- | ----do---- | | |
| 27 days | ----do---- | ----do---- | ----do---- | | |

The foregoing chart affords conclusive proof that the addition of an 0.1% solution of BPL to a sample of pasteurized homogenized milk inoculated with *Staphylococcus aureus* served to control the microbiological growth of bacteria as to keep the milk in fresh condition for approximately four weeks.

*Use of BPL in Chicken and Chicken Broth Inoculated With* Staphylococcus aureus

Further experimentation and tests were performed on a sample of Gerbers strained chicken and chicken broth. A 3½ ounce container of this material was purchased and 50 ml. of sterile water was added to the baby food. This mixture was inoculated with 0.5 ml. of a culture of *Staphylococcus aureus*. The tests were carried out in the manner previously described with respect to the pasteurized homogenized milk.

The following table shows the results obtained:

control the microbiological growth of bacteria as to keep the baby food in fresh condition for approximately four weeks time.

Similar experiments were performed using various percentages of concentration of BPL on Gerbers strained chicken and chicken broth samples that were inoculated with cultures of:

(*a*) Spore suspension of F.S. #1518: *Bacillus stearothermophilus*, a thermophilic facultative anaerobe. Use Dextrose Tryptone Brom Crasol Purple Agar and incubate at 55° C.

(*b*) Spore suspension of P.A. #3679: A mesophilic, putrefactive anaerobe, closely related to *Clostridium sporogenes*. Incubate in anaerobic media at 35–37° C.

These cultures were obtained from the Research and Technical Department of American Can Company, Maywood, Illinois, and the media prepared in accordance with the "Recommended Methods for the Microbiological

*Keeping Quality of Chicken Broth Inoculated With S. aureus and Treated With BPL*

| Time | Percent concentration of BPL solution | | | Control | |
|---|---|---|---|---|---|
| | Tube #1, 1% | Tube #2, 0.1% | Tube #3, 0.01% | Inoculated | Not inoculated |
| 1 day | No odor | Smells fresh | Beginning to smell putrid | Putrid | Off odor. |
| 2 days | ----do---- | ----do---- | Heavy growth | Heavy growth | Growth |
| 5 days | ----do---- | ----do---- | Discarded | Discarded | Discarded. |
| 12 days | ----do---- | ----do---- | | | |
| 27 days | ----do---- | ----do---- | | | |

The foregoing table affords conclusive proof that the addition of an 0.1% solution of BPL in one sample and the addition of a 1% solution in another sample of baby food inoculated with *Staphylococcus aureus* served to Examination of Foods," 1958, American Public Health Association. These experiments extended over a period of 42 days and the following tables indicate the obtained results.

*Use of BPL in Chicken Broth Inoculated With Bacillus stearothermophilus*

| Time | Percent concentration BPL solution | | | | Control | |
|---|---|---|---|---|---|---|
| | 1% | 0.2% | 0.1% | 0.01% | Inoculated | Not inoculated |
| 1 day | No growth | No growth | No growth | Heavy growth | Heavy growth | Growth. |
| 5 days | ----do---- | ----do---- | ----do---- | Heavy growth, discard | Heavy growth, discard | Heavy growth, discard. |
| 8 days | ----do---- | ----do---- | ----do---- | | | |
| 42 days | ----do---- | ----do---- | ----do---- | | | |

*Use of BPL in Chicken Broth Inoculated With Clostridium sporogenes*

| Time | Percent concentration BPL solution | | | | Control | |
|---|---|---|---|---|---|---|
| | 1% | 0.2% | 0.1% | 0.01% | Inoculated | Not inoculated |
| 1 day | No growth | No growth | No growth | Heavy growth, strong putrid odor | Heavy growth, strong putrid odor | No growth. |
| 5 days | ----do---- | ----do---- | ----do---- | Discard | Discard | Growth. |
| 8 days | ----do---- | ----do---- | ----do---- | | | Discard. |
| 42 days | ----do---- | ----do---- | ----do---- | | | |

Subcultures were made at the time interval stated and were kept for five days in order to determine whether or not growth had taken place. The findings show conclusively that chicken broth inoculated with *Bacillus stearothermophilus* and incubated at 55° C. can be kept sweet for a period of at least six weeks when an 0.1% aqueous solution of BPL is added to the inoculated broth.

The identical procedure was followed in connection with the chicken broth inoculated with *Clostridium sporogenes* with the identical finding that the addition of an 0.1% aqueous solution of BPL was sufficient to keep the inoculated broth sweet for six weeks when held at a temperature of approximately 37° C.

Reference to the foregoing tables also indicates that an 0.2% aqueous solution of BPL and a 1% solution of BPL will also maintain the treated material in sweet fresh condition for a like period of time.

*Shelf Life of Cream and Creamed Cheese When Treated With an Aqueous Solution of BPL*

The method followed in this experiment may be summarized by stating that a 10% solution of BPL, produced in the manner above mentioned, was used. Of this solution, 2.5 ml. was added to 250 ml. of cream which had previously been inoculated with *Pseudomonas fragi*. This mixture resulted in a final concentration of 0.1% BPL in the inoculated cream.

The following table shows the results of the experiments wherein inoculated and control samples of cream and creamed cheese were utilized together with the results obtained when identical samples of the inoculated cream and cream cheese were treated with an 0.1% aqueous solution of BPL.

| Time, days | Cream | | Creamed cheese | | Inoculated and treated with chemical [2] | |
|---|---|---|---|---|---|---|
| | Inoculated [1] | Control | Inoculated [2] | Control | Cream | Creamed cheese |
| Start | 62,000 | 42,000 | 190,000 | 190,000 | <3,000 | 210,000 |
| 5 | 350,000,000 | 89,000 | 210,000,000 | 180,000 | 0 | 0 |
| 10 | ([3]) | 18,000,000 | ([3]) | 18,000,000 | 0 | 0 |
| 15 | ([3]) | 240,000,000 | ([3]) | 290,000,000 | 0 | 0 |

[1] Inoculum used was Pseudomonas fragi.
[2] Chemical used was BPL in a final concentration of 0.1%.
[3] Too many to count.
NOTE—All samples stored at approximately 45° F.

The foregoing table affords conclusive evidence and proof that the addition of an 0.1% solution of BPL to samples of cream and creamed cheese serve to so inhibit microbiological growth as to preserve both the cream and creamed cheese in excellent condition for an extended period of time thus greatly prolonging its shelf life. Incidentally, the usual practice followed for the determination of shelf life of a product consists in making dilutions in the range of 1:100 to 1:100,000.

*Use of Aqueous Solution of BPL on Cheddar Cheese Inoculated With Mold*

Further experiments were conducted on samples of Cheddar cheese that were inoculated with a species of Penicillium obtained from a contaminated agar plate. Both controls and experimental samples of cheese were used. The experimental samples were sprayed with aqueous solutions of BPL ranging in strength from 0.1 to 1% and all samples were wrapped separately in Saran wrap, sealed with a hot iron and stored at 50° F. After a lapse of approximately four months, the untreated inoculated samples were moldy and rancid. The samples which had been inoculated and sprayed with the various percentages of concentration of the BPL solution had varying degrees of mold and showed only a slight change in color.

From the exhaustive experiments performed, it is believed that the aqueous solution of BPL having a concentration of 0.5% afforded optimum results.

Similar experiments with known cultures of Aspergillus and Mucor have been conducted with wholly satisfactory results being obtained where samples were treated with 0.5% BPL.

In some instances, it was found that the spraying of the wrapper alone with 0.1% BPL solution was sufficient to inhibit the growth of mold on the sample.

The foregoing recitation of a selection of illustrative experiments and tests, the majority of which were conducted at Indiana University Medical Center, and the resultant tables compiled therefrom provide adequate proof that foods and more particularly dairy products can be preserved to lengthen their shelf life by the use of an additive in the form of an aqueous solution of BPL.

One of the marked advantages flowing from my discovery resides in the fact that the germicidal action of the aqueous BPL solution to effectively kill the microorganisms, takes place in a matter of a few hours time due to the rate of its hydrolysis and that the beneficial results persist for many weeks when the treated food is protected against recontamination. A further advantage of my discovery lies in the fact that after the initial effective action of the germicidal aqueous BPL solution on the food product to control or inhibit microbiological growth of bacteria the aqueous BPL solution reverts to a harmless isomer of lactic acid so that the treated food is adapted for human consumption without fear of detrimetal results.

By way of analogy, the present invention is similar, in many respects to that described in U.S. Letters Patent No. 2,550,253, issued to Lloyd B. Jensen et al. on April 24, 1951, which utilizes an antibiotic in the process of the quick-curing of hams.

The marked difference between the use of an antibiotic material in the quick-curing of hams and the use of an aqueous solution of BPL in the treatment of dairy products resides in the fact that the aqueous solution of BPL reverts by hydrolysis to a harmless material similar to lactic acid which is nontoxic in nature.

From the foregoing description of the present invention it will be noted that a new and improved method of treating foods and dairy products has been disclosed wherein the addition of an aqueous solution of BPL having a small percentage of concentration to the food effects the control of microbiological growths of bacteria to insure against the deterioration of the treated food and preserve the palatable life of the product.

While the invention has been described in considerable detail in the foregoing specification, it is to be understood that different food products may require variations in the range of concentration of the aqueous solution of BPL to obtain optimum results. For this reason it is to be understood that the disclosed range of percentages of concentration of the aqueous solution of BPL is intended to be illustrative rather than limiting in nature and that the scope of protection, hereinafter claimed, shall be construed as the range of concentration of the solution of BPL which will be effective to produce the desired results without having any material detrimental effect upon the treated foods.

I claim:
1. The process of treating food normally subject to spoilage by reason of bacterial growth which comprises the addition of a germicidal material in the form of an aqueous solution of BPL to thereby control the microbiological growth of bacteria in the food to insure against the deterioration of the treated food.

2. The process of treating food normally subject to spoilage by reason of bacterial growth which comprises the addition of a germicidal material in the form of an aqueous solution of BPL having a concentration of between 0.1 and 1 percent to thereby control the microbiological growth of bacteria in the food to insure against the deterioration of the treated food.

3. The process of treating food normally subject to spoilage by reason of bacterial growth which comprises the addition of a germicidal material in the form of an aqueous solution of BPL having a concentration of between 0.1 and 1 percent to promptly control the microbiological growth of bacteria in the food, said aqueous solution of BPL reverting by hydrolysis after a short period of time to a harmless isomer of lactic acid whereby the food is simultaneously treated and rendered fit for human consumption without deleterious effect.

4. The process of treating food normally subject to spoilage by reason of bacterial growth which comprises the addition of a germicidal material in the form of an aqueous solution of BPL having a concentration of between 0.1 and 1 percent to control the microbiological growth of bacteria in the food within a few hours during which time said solution of BPL simultaneously reverts to a harmless isomer of lactic acid whereby the food is simultaneously treated and rendered fit for human consumption without deleterious effect.

5. The process of treating a dairy product that is normally subject to spoilage by reason of bacterial growth which comprises the addition of a germicidal material in the form of an aqueous solution to BPL to thereby control the microbiological growth of bacteria in the product to insure against its deterioration.

6. The process of treating a dairy product that is normally subject to spoilage by reason of bacterial growth which comprises the addition of a germicidal material in the form of an aqueous solution of BPL having a concentration of between 0.1 and 1 percent to thereby control the microbiological growth of bacteria in the product to insure against its deterioration.

7. The process of treating a dairy product that is normally subject to spoilage by reason of bacterial growth which comprises the addition of a germicidal material in the form of an aqueous solution of BPL having a concentration of between 0.1 and 1 percent to promptly control the microbiological growth of bacteria in the treated product, said aqueous solution of BPL reverting under hydrolysis after a short period of time to a harmless isomer of lactic acid whereby the treated food is simultaneously preserved and rendered fit for human consumption without deleterious effect.

8. The process of treating a dairy product that is normally subject to spoilage by reason of bacterial growth which comprises the addition of a germicidal material in the form of an aqueous solution of BPL having a concentration of between 0.1 and 1 percent to control the microbiological growth of bacteria in the treated product within a few hours time during which time said solution of BPL reverts to a harmless isomer of lactic acid whereby the treated product is simultaneously preserved and rendered fit for human consumption without deleterious effect.

References Cited in the file of this patent

UNITED STATES PATENTS

| | | |
|---|---|---|
| 2,154,449 | Hoffman et al. | Apr. 18, 1939 |
| 2,379,294 | Gooding | June 26, 1945 |

OTHER REFERENCES

"The Merck Index," seventh edition, 1960, published by Merck & Co., Inc., Rahway, N.J., page 860.

"Synthetic Food Adjuncts," by Jacobs, D. Van Nostrand Co., Inc., 250 4th Ave., New York, 1947, page 239.